United States Patent [19]
Day

[11] Patent Number: 4,521,306
[45] Date of Patent: Jun. 4, 1985

[54] MECHANICALLY RAKED BAR SCREEN WITH CONVEYOR SYSTEM HAVING ELASTOMERIC RAKES

[75] Inventor: John T. Day, Winfield, Md.
[73] Assignee: Rubber Millers, Inc., Baltimore, Md.
[21] Appl. No.: 560,395
[22] Filed: Dec. 12, 1983
[51] Int. Cl.³ .............................................. C02C 1/22
[52] U.S. Cl. .................................. 210/159; 210/163; 210/413
[58] Field of Search ............... 210/159, 162, 413, 415, 210/154, 153, 407; 209/379, 385, 389

[56] References Cited

U.S. PATENT DOCUMENTS

| | | | |
|---|---|---|---|
| 1,823,823 | 9/1931 | Dundas et al. | 210/159 |
| 2,128,349 | 8/1938 | Briggs | 210/413 |
| 2,762,571 | 9/1956 | Antener | 209/385 |
| 3,061,103 | 10/1962 | Mitchell | 210/413 |
| 4,126,551 | 11/1978 | Cognevich | 210/159 |
| 4,277,339 | 7/1981 | Quin | 210/159 |

FOREIGN PATENT DOCUMENTS

| | | | |
|---|---|---|---|
| 2711309 | 9/1977 | Fed. Rep. of Germany | 210/159 |
| 2035140 | 6/1980 | United Kingdom | 209/389 |

Primary Examiner—Richard V. Fisher
Assistant Examiner—W. Gary Jones
Attorney, Agent, or Firm—A. W. Breiner

[57] ABSTRACT

A bar screen/conveyor system for collecting debris or the like in a stream of liquid, including collector rakes for attachment to the conveyor which are made of a tough, abrasion-resistant and corrosion-resistant elastomer is described. The preferred elastomers for use in rake fabrication are polyurethane elastomers. The conveyor systems which include the elastomeric rakes have greater durability and use life without problems than the heretofore conveyor systems utilizing metal rakes.

7 Claims, 5 Drawing Figures

4,521,306

MECHANICALLY RAKED BAR SCREEN WITH CONVEYOR SYSTEM HAVING ELASTOMERIC RAKES

FIELD OF INVENTION AND BACKGROUND

The present invention relates to a conveyor system for removing debris, trash, and similar material from a moving body of water such as in a sewage treatment plant. More particularly, the invention is directed to a new and improved rake member for installation on a conveyor which is constructed of a tough, highly abrasion- and corrosion-resistant elastomer.

Mechanically raked bar screens are used in a variety of circumstances, for example in the treatment of sewage to remove suspended solids from a flow of liquid. Such screens comprise a series of parallel grating bars which extend across the channel, duct, or other opening carrying the liquid, the bars being preferably upwardly inclined in a vertical plane. The teeth of rake members carried by an endless conveyor project through the grating bars, and as the endless belt is continuously rotated debris or the like is cleared from the inner face of the bar screen and carried by the rake teeth. The backing portion of the rake which carries the teeth rides against the grating bars as the rake is carried upward to deposit the collected debris or the like at the top of the conveyor. The configuration of the bar screen and the conveyor system varies. For example, the bars may be aligned either vertically or obliquely to the vertical or they may be curved, in which case they will generally be arranged with their concave sides facing upstream of the flow of liquid to be screened. Regardless of the nature of the construction, however, the teeth of the rake must pass through the bars in close-fitting relation in order to remove all of the debris, including finely divided debris.

In the construction of the mechanically raked bar screens, the bars have been constructed of steel rods, spaced apart and welded; and the rake has been similarly constructed of a metal such as steel. Heretofore it was believed essential that the rakes, including the teeth of the rakes, be constructed of steel or other heavy metal in order to ensure the necessary durability and carrying strength. The construction of the rakes from metal was with the recognition of the problems which occur when the teeth of the rakes do not align exactly so as to pass between the spaced parallel bars, which leads to a jamming of the teeth into and against the bars. Since the jamming or damage usually occurs at the point of alignment of the teeth and bars which is below the surface of the stream of liquid being treated, resolution of the jamming problem necessitates closing down the operation and, more often than not, the emptying of the liquid being treated from the channel to permit replacement or repair of the rakes. Further, the metal rakes, because of the corrosive nature of the effluent carried particularly in sewage treatment plants and the riding of the backing member of the rake against the bars, have only a limited life.

PRIMARY OBJECT AND GENERAL DESCRIPTION OF INVENTION

Accordingly, it is a primary object of the present invention to provide a conveyor system for removing debris, trash, and similar materials from a moving body of water, for example in a sewage treatment plant, wherein the rake members of the system are constructed of a tough, highly abrasion- and corrosion-resistant elastomer. The elastomer must have the necessary strength so that the teeth will carry the collected debris or the like, but yet must be sufficiently flexible so that the teeth will deflect in the event the teeth do not align exactly with the spaced parallel bars. Of primary consideration and concern, therefore, is to provide an elastomer which is strong enough to lift out and carry the debris or the like from the liquid stream and which is flexible enough to allow deflection when in jamming engagement with the metal bar screens. Elastomers which have been found suitable are those having a durometer reading of from about 80 Shore A to about 85 Shore D, and which will have at least about 75% elongation before failure. Preferably the elastomer will have a durometer reading of 95 Shore A to 60 Shore D. The preferred elastomers are the castable polyurethane elastomers. However, certain castable nylon block copolymers and certain high molecular weight polyolefins also have the essential characteristics. Heretofore it was not considered possible to mold the rakes from a material other than metal, and the ability to fabricate a rake for use with a conveyor system of the type described herein is surprising.

THE DRAWING AND PREFERRED EMBODIMENT

The invention will be described with reference to the drawing which illustrates the presently preferred embodiment of the invention. In the drawing, FIG. 1 is an elevational view, partly in section and with certain elements omitted, showing a conveyor system installed in a sewage treatment channel;

Figure 1:
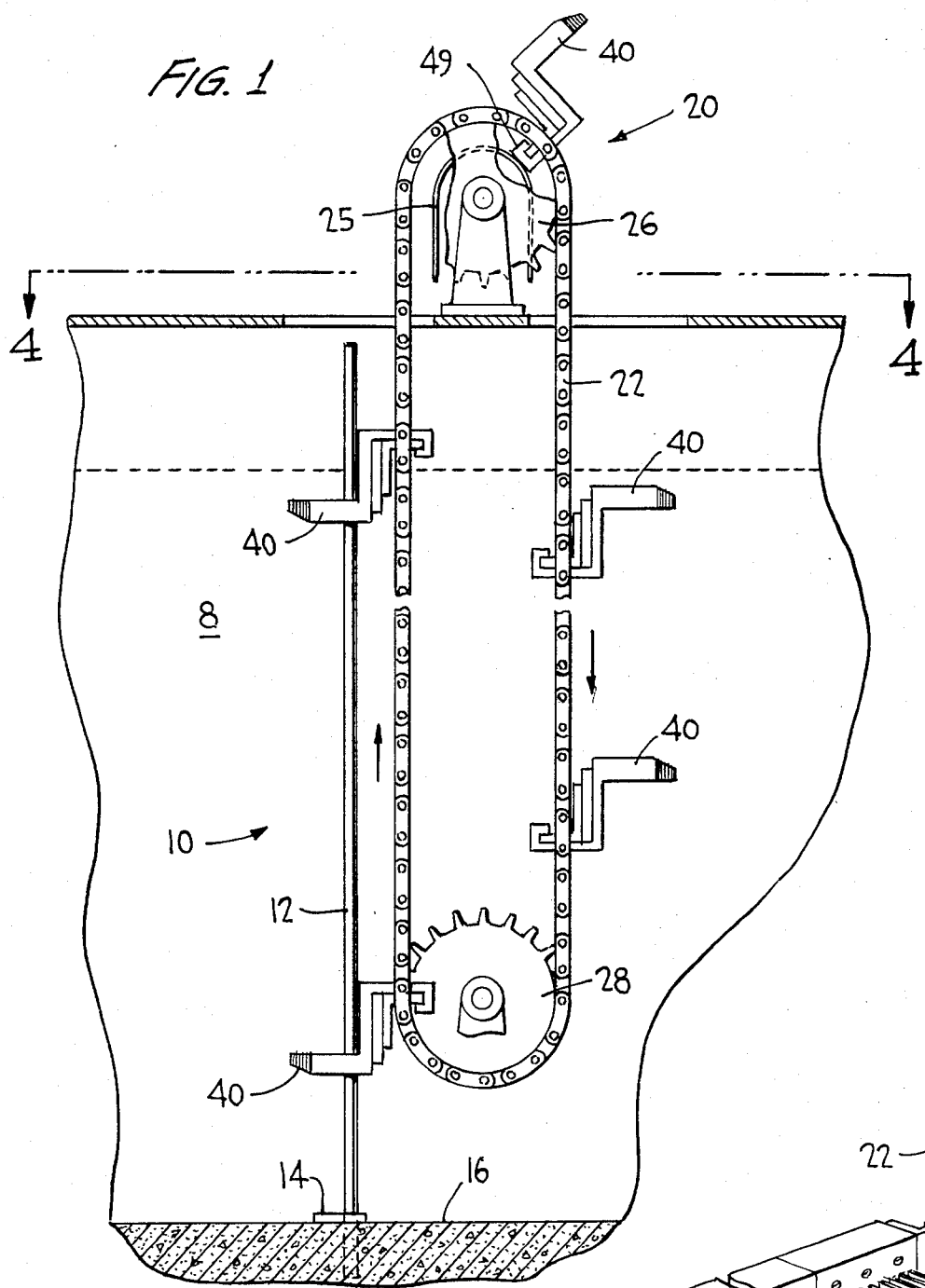
Figure 2:
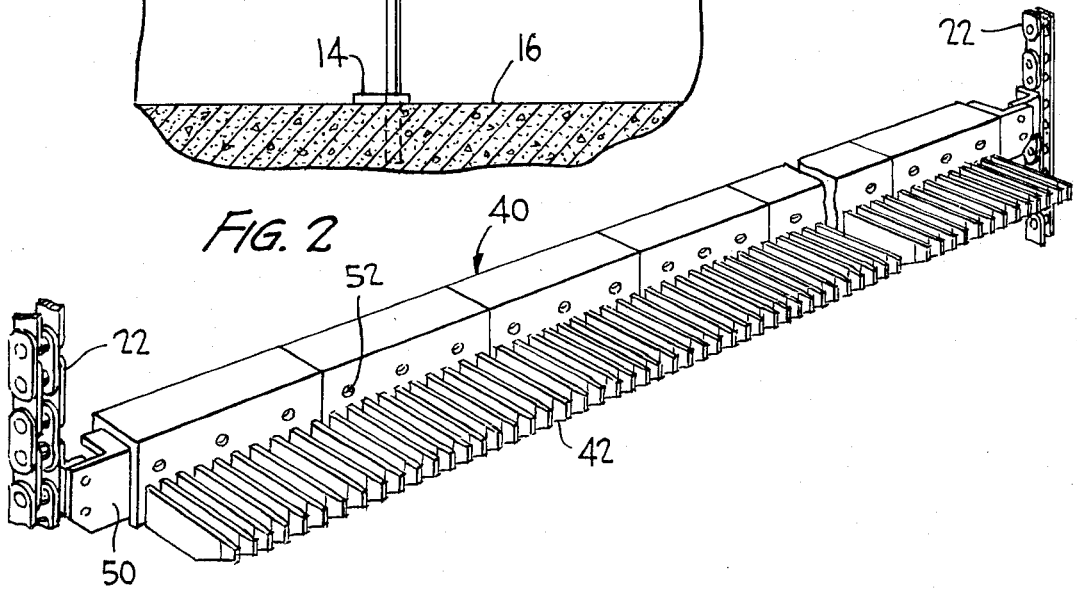
FIG. 2 is a perspective view of the rake attached to the chain drives.
Figure 3:
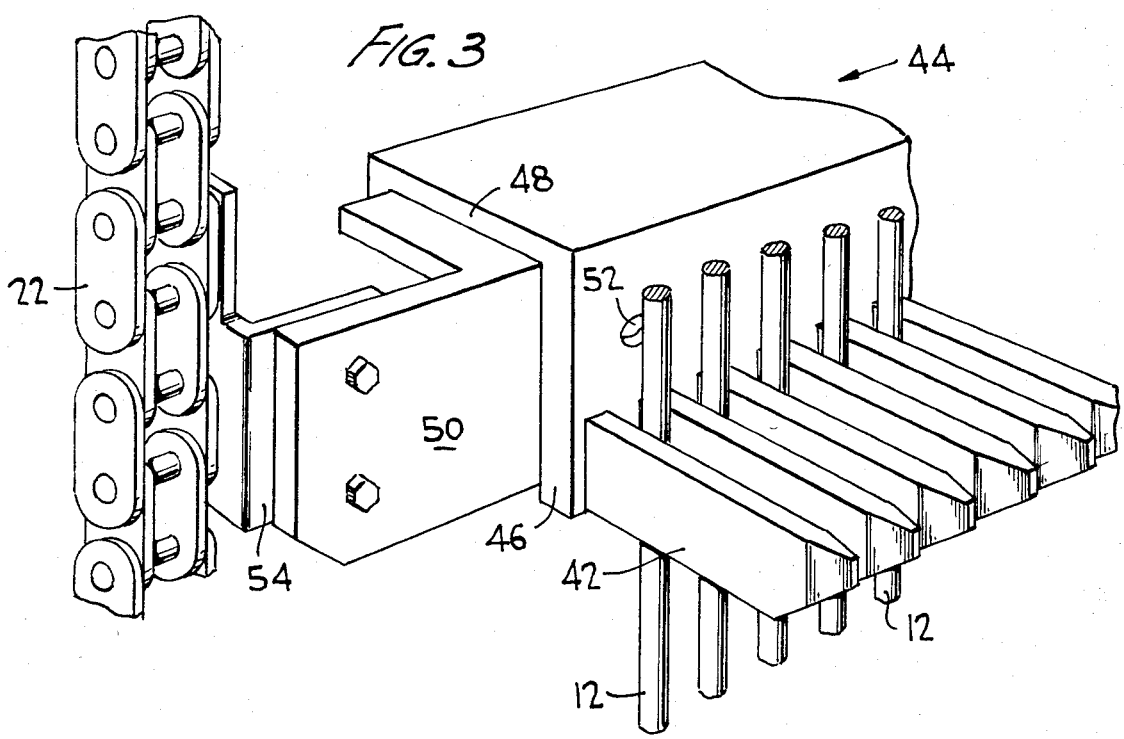
FIG. 3 is an enlarged perspective view of one end of a section of the conveyor system partly broken away.
Figure 4:
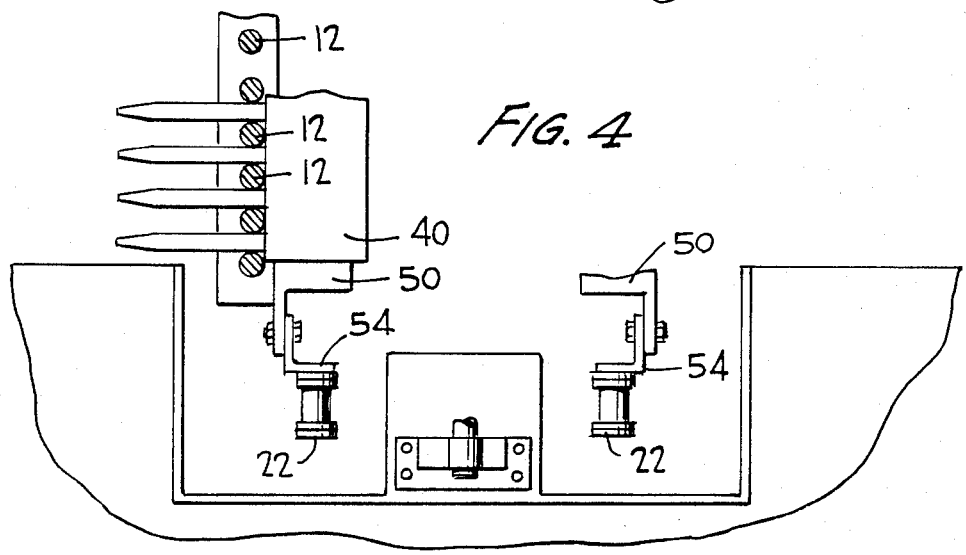
FIG. 4 is a sectional view taken along line 4—4 of FIG. 1.

Referring first primarily to FIGS. 1, 2 and 4 of the drawing, there is shown a vertically extending bar screen 10 comprising an array of parallel bars 12 anchored at a first lower end 14 in the base or floor 16 of a channel 8 carrying a liquid such as in a sewage treatment plant. The bar screen will be stabilized at its second or upper end, not shown. A conveyor system 20 comprising a pair of endless sprocket chains 22 carried by suitably mounted upper and lower sprocket wheels 26 and 28 are vertically positioned in the liquid-carrying channel adjacent to and downstream from the bar screen. The sprocket wheels are driven by a motor attached to a drive shaft of the conveyor system, not shown. The sprocket chains carry a plurality of transversely extending rake members 40 as shown in FIG. 1. As best shown in FIGS. 2 and 3, the rakes 40 are attached to an angle bar 50 and bolted with bolts 52. Angle bar 50, in turn, is attached to the sprocket chain through angle bar members 54. The angle bar member 50, as shown in FIG. 2, extends transversely the full distance between sprocket chains 22.

Figure 5:
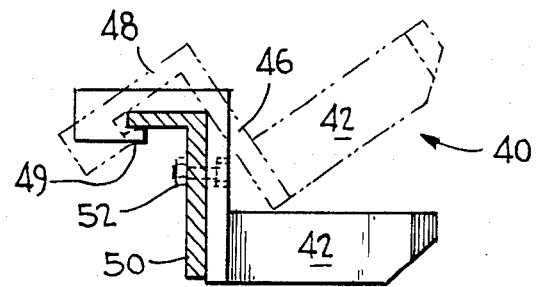
FIG. 5 is a view showing how the rake is attached to and removed from the rake carrier bar.

As best shown in FIGS. 2, 3, and 5, the elastomeric rake 40 comprises teeth 42 integrally molded with a backing member 44 for attachment of the rake to angle bar rake carrier 50. The backing member includes a vertically extending leg 46 and a horizontally extending member 48. Member 48 terminates in an ear 49 for receiving the edge of the angle bar 50. Ear 49 also, as will be described later, provides a wear surface. In the preferred embodiment the rake is made in section, as shown in FIG. 2, each section preferably being from 15 to 18 inches. Making the rake in sections simplifies repair in the event a single tooth of the rake is broken or damaged. The rakes, as previously stated, are attached to carrier bar 50 with bolts 52.

As best shown in FIG. 3, the teeth of the rake are spaced to provide close fitting engagement with the parallel bars of the bar screen. It is essential to have close fitting engagement in order to ensure complete removal of debris in the liquid medium, including finely divided debris, or the like. Heretofore, with metal rakes, as a result of the close fitting engagement of the bars with the rake teeth, there was a high degree of wear at the point where the bars engage the teeth and ride against the backing member of the rake. Additionally, because of the close fit of the teeth between the bar elements, any misalignment could be a binding or jamming of the rake against the bar, leading to down time. With the present elastomer rakes, the rake teeth, while having the necessary carrying strength, have a sufficient degree of flexibility to compensate for minor misalignments. To further compensate for misalignment, as best shown in FIG. 5, the leading ends of the teeth are tapered from the bottom to a flat top in the vertical direction and are also tapered, extending in the horizontal direction.

As shown in FIG. 5, in attaching and removing the teeth the ear 49 of the backing portion of the rake is fitted around the metal angle bar 50. The elastomeric material permits sufficient flexing to permit the rake to be snapped into a tight-fitting relation with the angle bar. Accordingly, the rake is primarily supported on the angle bar by its seating on the angle bar with the ear taking the primary stress. The bolts merely serve to hold the rake in place. Since little or no support is provided by the bolts, there is no problem with respect to tearing or failure of the backing member at the bolt holes.

As shown in the embodiment of FIG. 1, the bar screen and the conveyor positioned adjacent to the bar screen are in vertical relation. In operation, the rake members engage the bar screen at the lower end of the bar screen, with the rake teeth passing between the spaced bars. With the upward movement of the rake, the rakes will collect any debris which is in contact with the bar screen. The debris is carried upward, passes over the top of the sprocket wheels of the conveyor and removed. To prevent having debris fall back into the channel, a sheet metal shield member 25 is positioned at the top of the conveyor. The wear surface of ear 49 on backing member 44, as shown in FIG. 1, rides on the shield as the rake passes around the sprocket wheel, cleaning and keeping the shield free of debris. The elastomer being flexible will not bind on the shield, but will provide a continuous cleaning of the shield. Being of tough polymer, the backing member has excellent wear characteristics. The debris is removed from the rakes at the top as the rakes start their downward movement. As shown in FIG. 1, the bar screen and the conveyor are in a vertical position. As will be apparent, however, the bar screen and conveyor can be placed at an oblique angle. The placing of the bar screen and conveyor at an angle can facilitate removal of the debris particularly in instances where the channel or duct being cleaned has only limited vertical height.

In one preferred embodiment of a bar screen/conveyor system in a sewage treatment plant, the bar screen and conveyor system will have a height of approximately 35 to 60 feet. The sprocket wheels are approximately three feet in diameter and the rakes are positioned on the conveyor drive chains at approximately every ten feet. The conveyor moves at a speed of approximately one to two feet per minute. The rakes which are approximately ten feet long are constructed in approximately seven separate sections as shown in FIG. 2. The teeth of the rack are approximately four to ten inches extending in the horizontal direction and have a height of approximately one and one-half to three inches. The spacing between the teeth and the thickness of the teeth is determined by the thickness of the grate bars in the bar screen and the distance between the bars. The bars are normally from one-half to one and one-half inches in diameter, with the spacing between the bars being from about one-quarter to three-quarters inch depending partially upon the degree of fineness of the debris to be collected. The bars need not be round, but can be rectangular which can be preferred from the standpoint of greater strength. The vertical leg of the backing member is approximately four to eight inches, with the horizontally extending member being approximately three to six inches. The ear is indented approximately one-half to three-quarters inch.

A rake is cast molded from an elastomer which, when cured, will have a hardness measured on the durometer scale of from about 80 Shore A to 85 Shore D, and preferably from about 95 Shore A to 60 Shore D. The elastomer should have an elongation before failure of at least about 75%, and preferably from about 150–300%, which will provide the essential degree of flexibility. In a preferred embodiment, 100 parts ADIPRENE L-167 which is a diisocyanate based polyether urethane prepolymer is mixed or blended with nineteen parts of 4,4'-methylene-bis(2-chloroaniline) curing agent. ADIPRENE L-167 is marketed by the duPont Company. The blend of prepolymer and curing agent is cast into an aluminum mold and heated for twenty minutes at a temperature of about 212° F. The rake is then removed from the mold for a final curing of approximately three hours at 212° F. The resultant molded rake has the essential hardness and flexibility as well as exceptional resistance to abrasion and the corrosive influences of the environment.

Other elastomers which can be used are the ultra-high molecular weight polyolefins and the nylon block copolymers such as the copolymer supplied under the tradename NYRIM by the Monsanto Chemical Company, or certain hard rubbers. It is preferable that the elastomer be castable. However, the elastomer can be machined, or injection or compression molded. It is essential that the elastomer contain the characteristics as above defined.

Advantages of the elastomeric rakes over steel rakes for use on a conveyor system of the type defined include the following:

(1) Being flexible, the rakes have some give and, accordingly, even if the rake teeth do not properly mesh with the bars of the bar screen they will not jam or damage the bar screens.

(2) The polyurethane and other elastomers are highly resistant to abrasion and, accordingly, have excellent wear characteristics including when the rake is used as a scraper as it passes around the sprocket wheel and in contact with a debris-collecting shield. The elastomer rakes, having a degree of lubricating characteristics, are less noisy when in contact with the metal shield.

(3) Being flexible, the rakes can be conveniently replaced on a metal carrier bar by snapping the rake into position on the bar. This is not possible with a metal rake.

As will be apparent to one skilled in the art, various modifications can be made within the scope of the aforesaid description. Such modifications being within the ability of one skilled in the art form a part of the present invention and are embraced by the appended claims.

It is claimed:

1. A debris removal system for removing debris from a fluid flow channel comprising a bar screen positioned in a fluid flow channel, conveyor means having attached thereto at least one elastomeric rake comprising teeth extending transverse to said conveyor means, said conveyor means being positioned whereby said teeth of said rake mesh with said bar screen for removal of debris from said bar screen, the elastomeric material of said elastomeric rake having a hardness measured on the durometer scale of 80 Shore A through 85 Shore D, and an elongation of at least 75% before failure; said rake further including a backing member for attachment of said rake to said conveyor, said backing member including a vertically extending leg and a horizontally extending leg, said horizontally extending leg terminating in a substantially U-shaped configuration; the legs of said U being constructed and arranged for mating with a member on said conveyor; shield means positioned at the top of said conveyor for preventing debris collected on said teeth from falling into said channel, said U-shaped member constructed and arranged to interrelate with said shield to keep said shield free of debris.

2. The system of claim 1 wherein said elastomeric material has a hardness measured on the durometer scale of 95 Shore A through 60 Shore D.

3. The system of claim 2 wherein the elastomer has an elongation before failure of from about 150–300%.

4. The system of claim 1 wherein the elastomeric material is a castable polyurethane.

5. The system of claim 1 wherein the elastomeric material is a castable nylon block copolymer.

6. The system of claim 1 wherein the elastomeric material is an ultra-high molecular weight polyolefin.

7. The system of claim 1 wherein said elastomeric rake attached to said conveyor means is constructed in a plurality of separate sections.

* * * * *